United States Patent
Charlier et al.

(10) Patent No.: US 7,386,325 B2
(45) Date of Patent: Jun. 10, 2008

(54) METHOD AND APPARATUS FOR A HOLSTER HAVING A USER INTERFACE

(75) Inventors: Michael L. Charlier, Palatine, IL (US); Paul Steuer, Hawthorn Woods, IL (US); Thomas Schirtzinger, Woodstock, IL (US); Simone Koo, Palatine, IL (US)

(73) Assignee: Motorola, inc., Schaumburg, IL (US)

( * ) Notice: Subject to any disclaimer, the term of this patent is extended or adjusted under 35 U.S.C. 154(b) by 377 days.

(21) Appl. No.: 09/968,650

(22) Filed: Oct. 1, 2001

(65) Prior Publication Data

US 2003/0064751 A1    Apr. 3, 2003

(51) Int. Cl.
*H04M 1/00* (2006.01)

(52) U.S. Cl. .................... 455/557; 455/90.3; 455/556.1; 455/347; 455/575.1

(58) Field of Classification Search ................. 455/557, 455/90.3, 556.1, 347, 575.1
See application file for complete search history.

(56) References Cited

U.S. PATENT DOCUMENTS

| | | | |
|---|---|---|---|
| 5,038,400 A * | 8/1991 | Baracat et al. ............. 455/90.3 |
| 5,898,161 A | 4/1999 | DeVita et al. | |
| 5,999,821 A | 12/1999 | Kaschke | |
| 6,115,616 A * | 9/2000 | Halperin et al. ............. 455/557 |
| 6,155,841 A | 12/2000 | Spanyar | |
| 6,385,463 B1 | 5/2002 | Lieberman et al. | |
| 6,628,961 B1 * | 9/2003 | Ho et al. ...................... 455/557 |
| 6,633,241 B2 * | 10/2003 | Kaikuranta et al. ........... 341/33 |
| 2002/0134828 A1 * | 9/2002 | Sandbach et al. ........ 235/60.12 |

FOREIGN PATENT DOCUMENTS

| | | |
|---|---|---|
| WO | WO 99/66814 | 12/1999 |
| WO | WO 00/10878 | 3/2000 |
| WO | WO 00/60438 | 10/2000 |

* cited by examiner

*Primary Examiner*—Joseph Feild
*Assistant Examiner*—S. Smith
(74) *Attorney, Agent, or Firm*—David S. Noskowicz

(57) ABSTRACT

A holster 101 for a portable electronic device 116 having a user interface 108 disposed upon said holster. The user interface is electrically coupled, through an electrical connector 202 to the portable electronic device when the portable electronic device is inserted into a cavity 102 of the holster. The user interface rotates or unfolds from the holster so that the user can interact with the user interface.

14 Claims, 6 Drawing Sheets

METHOD AND APPARATUS FOR A HOLSTER HAVING A USER INTERFACE

BACKGROUND OF THE INVENTION

The present invention relates generally to user interfaces. More particularly the present invention is directed to incorporating a user interface into a holster.

Handheld electronic devices, such as cellular radiotelephones are generally small and lightweight, making them portable and easy to carry. As a result, they are highly function specific and they only require limited user interface capability. However, the current trend is to combine cellular radiotelephones with other electronic device. As a result of this trend, device operation has become more complex, adding features such as internet browsing, text messaging, video streaming and personal information management (PIM) in to typical voice communication operation. As a consequence these devices either increase in complexity of operation or must increased in device size to accommodate the needed user interface capability, both of which are contrary to the desire to reduce device size, weight and ease of use.

One solution currently being adapted is to add multiple functions to a single button say on the keypad of a cellular radiotelephone. Each device mode type however requires a unique user interface that compliments the functionality of the different mode types and therefore requires that many functions be added to a limited number of buttons. This often leads to operator confusion and increased complexity of device operation, inhibiting use.

Another solution adapted to increase the user interface capability is the addition of external devices for data entry such as portable keyboards. Some of the keyboards are folding but nevertheless must be carried in addition to the electronic device making them awkward and cumbersome to the user. In addition these types of devices substantially increase the weight of the overall portable device making them less attractive to the user and again inhibiting use. These device must also be carried separately in a bag making them even more cumbersome and more easily lost.

Accordingly, a system is needed to allow easy data entry yet maintain portability and wearability of wireless communication devices.

DETAILED DESCRIPTION OF THE INVENTION

A holster for a portable handheld electronic device is described. More particularly a holster incorporating a user interface for the portable handheld electronic device is described.

Portable electronic devices often come with a holster for stowing the device on ones person, typically with the use of a belt clip. The holster is simply a passive device adapted to receive the portable electronic device. Holsters or belt clips are in most cases standard accessories, or at least available after market for wireless communication devices such as radiotelephone handsets, pagers or the like.

Wireless communication device trends indicate that radiotelephones will become more data centric, requiring a user interface that accommodates data entry operations. Current, existing radiotelephone keypad designs make data entry cumbersome and awkward reducing potential for data communications.

Figure 1:
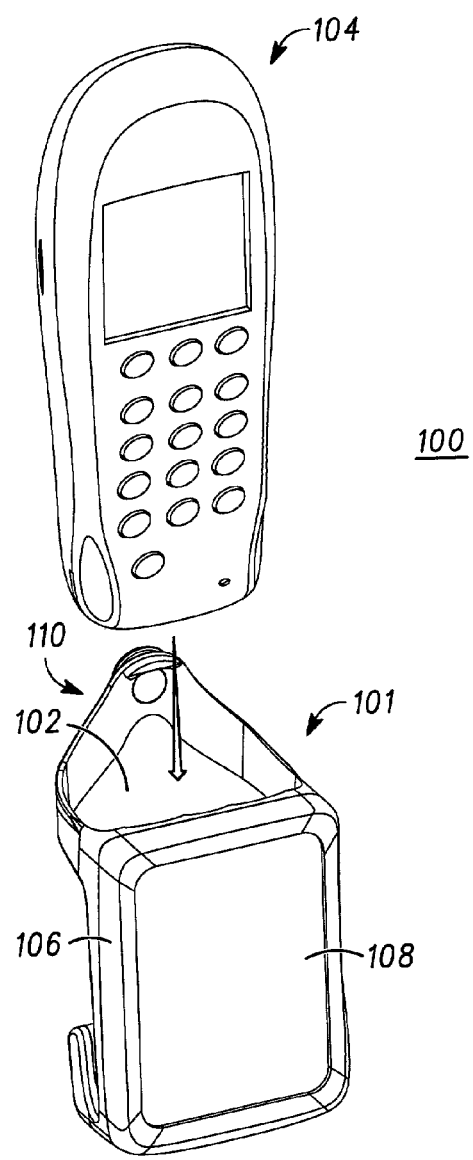
FIG. 1 is an exemplary perspective view of the holster.

A wireless communication device holster is shown in FIG. 1. The present invention is a portable electronic device holster 101 comprising a body 100 that has a cavity 102 for receiving a portable electronic device 104. The holster 101 may be product specific in nature or capable of accommodating multiple products with similar form factors. The holster 101 may be a hard material such as plastic or a soft malleable material such as a textile or formable material shapeable to the contour of the device 116. Disposed upon an outerside 106 of the body 100 is a user interface (UI) 108. The user interface 108 maybe any one of many user interfaces, or combination thereof. This may include, a touchpad, a keypad. A display, or a touchpad display.

A clip 110 or attachment means in one embodiment is disposed on an outerside 106 of said body 100. The clip can be used to attach the holster 101 to ones body or other object. The clip can be clipped to a belt or a purse in one instance. It may also be used to clip the holster 101 to components in a car such as an air vent or other object that holds the device to the vehicle in a useable fashion to the user. The clip in one embodiment is a belt clip 110 and is on an opposing outer side from said UI 108. In another embodiment the clip is a belt loop.

Figure 2:
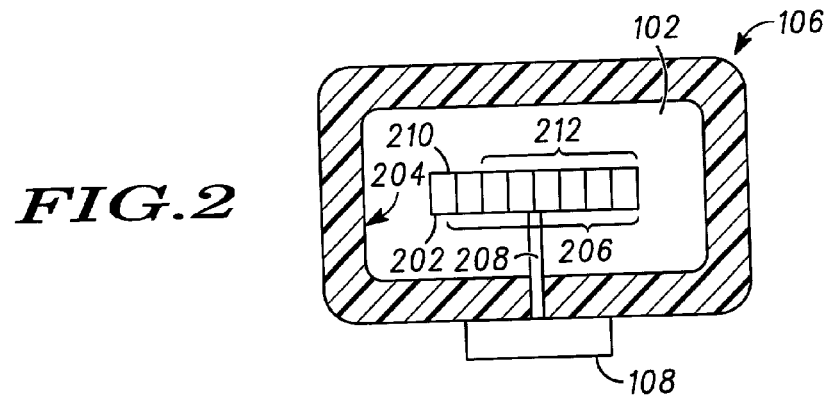
FIG. 2 is an exemplary top down cross section view of the holster and user interface.

The UI 108 is electronically coupled to the portable electronic device 104 through a wired or wireless link. In one embodiment, shown in FIG. 2, a connector 202 is disposed on an innerside 204 of the cavity 102 of the body 100 of the holster. A wire bus 208 is routed from the UI 108 to the connector 202. When the portable electronic device 104 is place into the cavity 102 of the holster 101, the connector 202 engages a corresponding connector (not shown) of the portable electronic device 104. Communication can now occur between the portable electronic device 104 and the UI 108. In one embodiment the connector 202 has a plurality of electrical contacts or pins 206 that engage corresponding electrical contacts of the connector disposed in the portable electronic device 104. The electrical contacts are assigned in accordance with the configured arrangement of the portable electronic device 104 contacts. For example, one embodiment contains a set of contacts or pins linearly arranged 206. Pin 1 210 is for power ground, pin 4 212 is for data transmission, pin 5 214 is for data reception, pin 7 216 a switched battery (V+) pin and pin 13 218 is another ground pin, designated for mode selection If the link between the electronic device is wireless, a transceiver (not shown) in the electronic device 104 communicates with a transceiver in the UI 108. The UI 108 would need to retain its own power source under this embodiment to power the transceiver. The wireless link could be established through Bluetooth, IrDa, or any short range RF transmission. This would further allow the UI 108 to communicate with the portable electronic device 104 even when the device 104 is removed from the holster and located within short distances from the portable electronic device 104.

Figure 3:
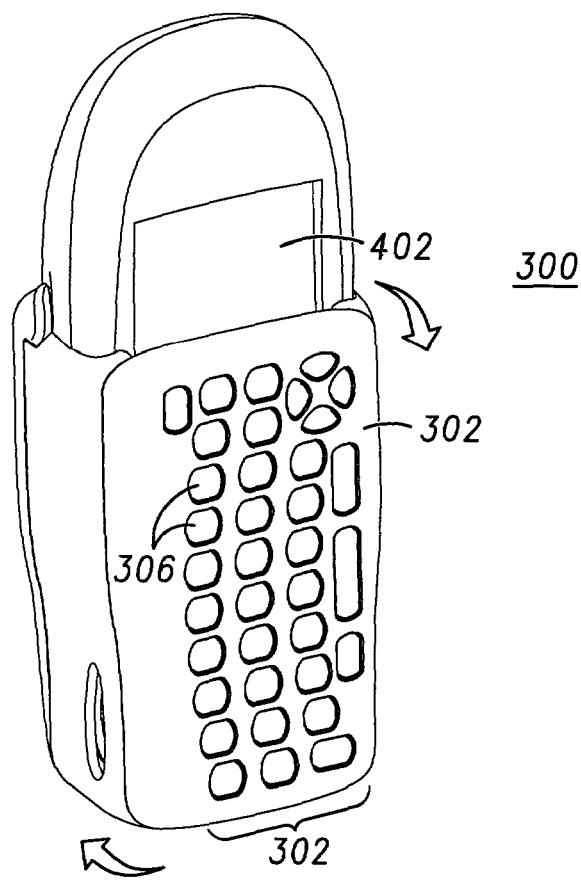
FIG. 3 is an exemplary perspective view of the holster and the UI in a stowed position.
Figure 4:
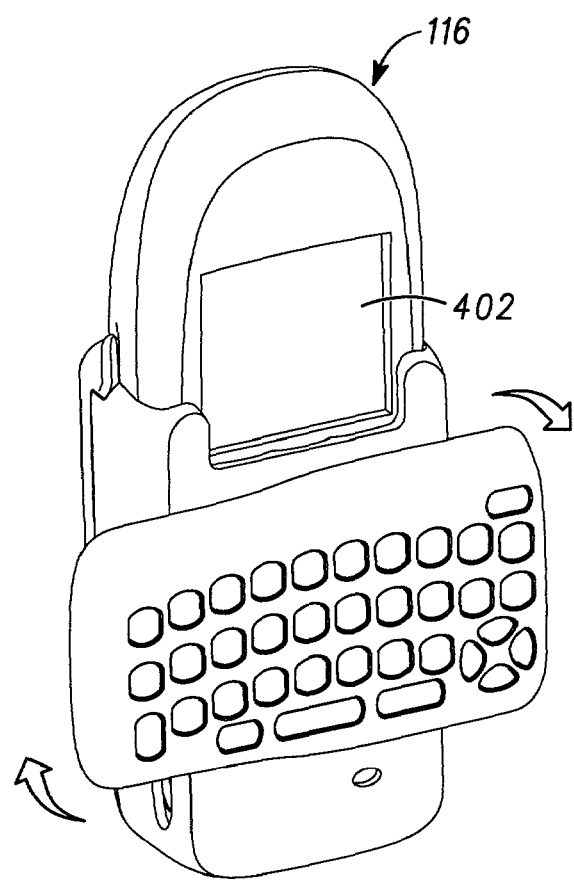
FIG. 4 is an exemplary view of the holster with the UI in a rotated position.

The user interface 108 is one that is adapted to accommodate the operation of the portable electronic device 104. In one embodiment, shown in FIG. 3, the UI 108 is a rotatable UI 302 that rotates in a plane adjacent to the holster. In one embodiment the rotatable UI 302 is rotatable keypad 304 that has buttons 306 arranged thereon in a QWERTY arrangement. In a first position 300, the rotatable keypad 304 is oriented in a portrait position, used generally when the rotatable keypad 304 is not in use, or stowed away. In another embodiment the rotatable UI 302 may be a multipurpose keypad (not shown) having a set of buttons unique to the portable electronic device 104. The keys or buttons can be arranged in any configuration necessary to further operation of the device 104. The rotatable keypad 304 rotates 90 degrees, shown in FIG. 4. In the case of a landscape arranged keypad, such as the QWERTY arrangement, the keyboard aligns with a display 402 located on the portable electronic device 104. The rotatable keypad 304 in either position interacts with the display 402 to enter data into the device 116. This could be for such functions as email, SMS, word processing, and the like. Power may be switched at the user interface 108 or automatically controlled by the portable electronic device 116. For example, power to the user interface 108 may be applied or removed when rotation of the user interface 108 occurs.

The user interface 108 may be a touch pad 502. The touch pad 502 may be mounted in a fixed position, or a rotating as described above. The touch pad 502 is used a positioning device such as a computer mouse or a writing tablet used with a stylus. The touch pad 502 can be one element or divided into two or more portions. For example, one portion may be for writing characters while another is for writing numbers. Buttons on the user interface 108 correspond to one function of the portable electronic device 116. This increases the ease of use of the portable electronic device 116 as the portable electronic device 116 may employ or assign several functions to one key or button on the device 116 user interface to save space. The user interface 108 of the holster 101 reduces the number of functions per key or button to one.

Figure 5:
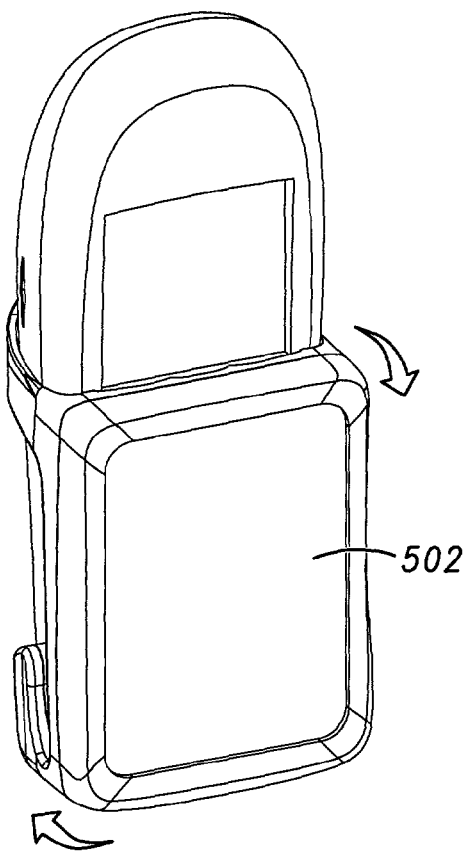
FIG. 5 is an exemplary view of the holster with the multimode touch screen display in a first position.
Figure 6:
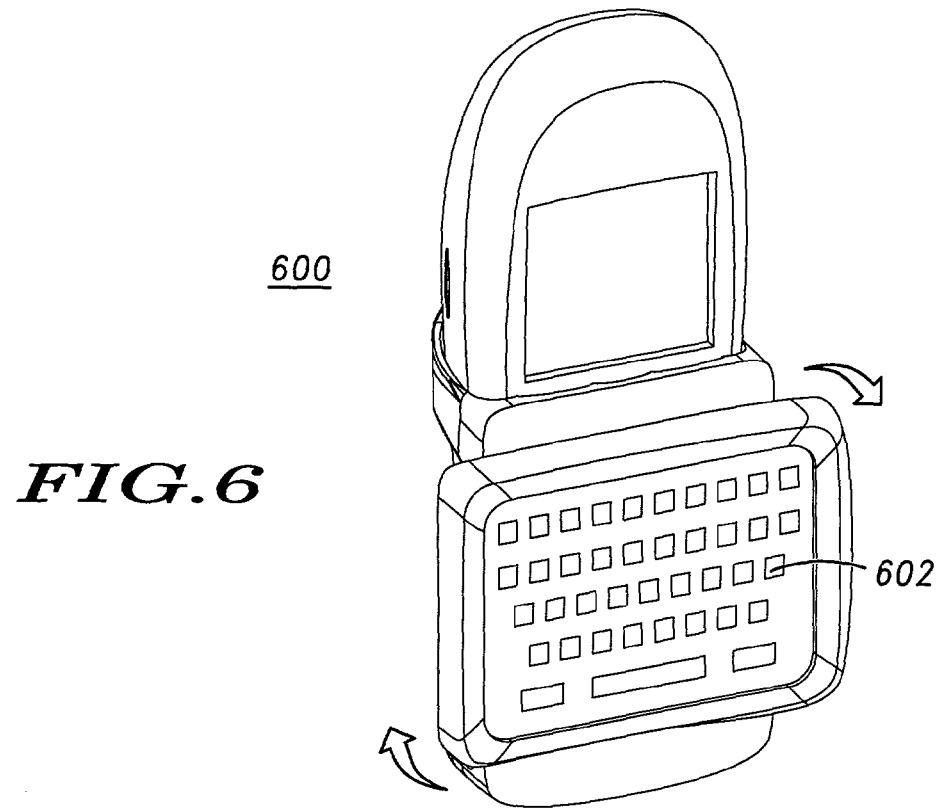
FIG. 6 is an exemplary view of the holster with the multimode touch screen display in a second position.

The user interface may also be a multimode touch screen display 502 as shown in FIG. 5. The multimode touch screen display 502 may be fixed or rotatable as well. As a rotatable UI 302 the multimode touch screen display 502 is active in any orientation of the rotatable UI 302. In the first position 500, the multimode touch screen display 502 is in a portrait mode. Objects, or Buttons and output information, are displayed so that they are viewable to the user in this orientation. When the touch screen is rotated 90° to a second position 600, the orientation of the objects displayed on the touch screen automatically orient to a landscape mode readable to the user in the landscape orientation. In the second position 600 the multimode touch screen display 502 can be configured to display any configuration operable with the capability of the portable electronic device. For example, the multimode touch screen display 502 may display a QWERTY keypad 602, a touch pad with handwriting recognition, or any other type if input device common with touch screen displays.

Figure 7:
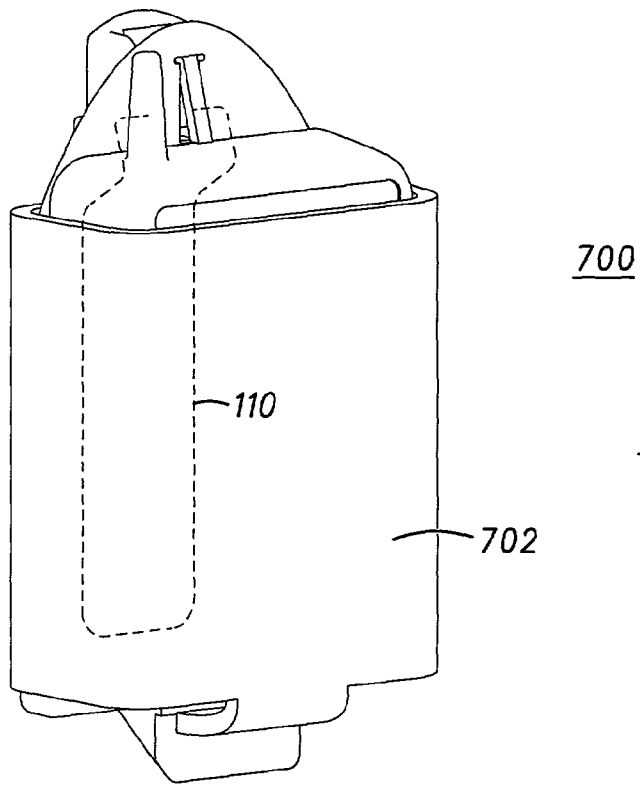
FIG. 7 is an exemplary view of the holster with the textile user interface in a wrapped position.
Figure 8:
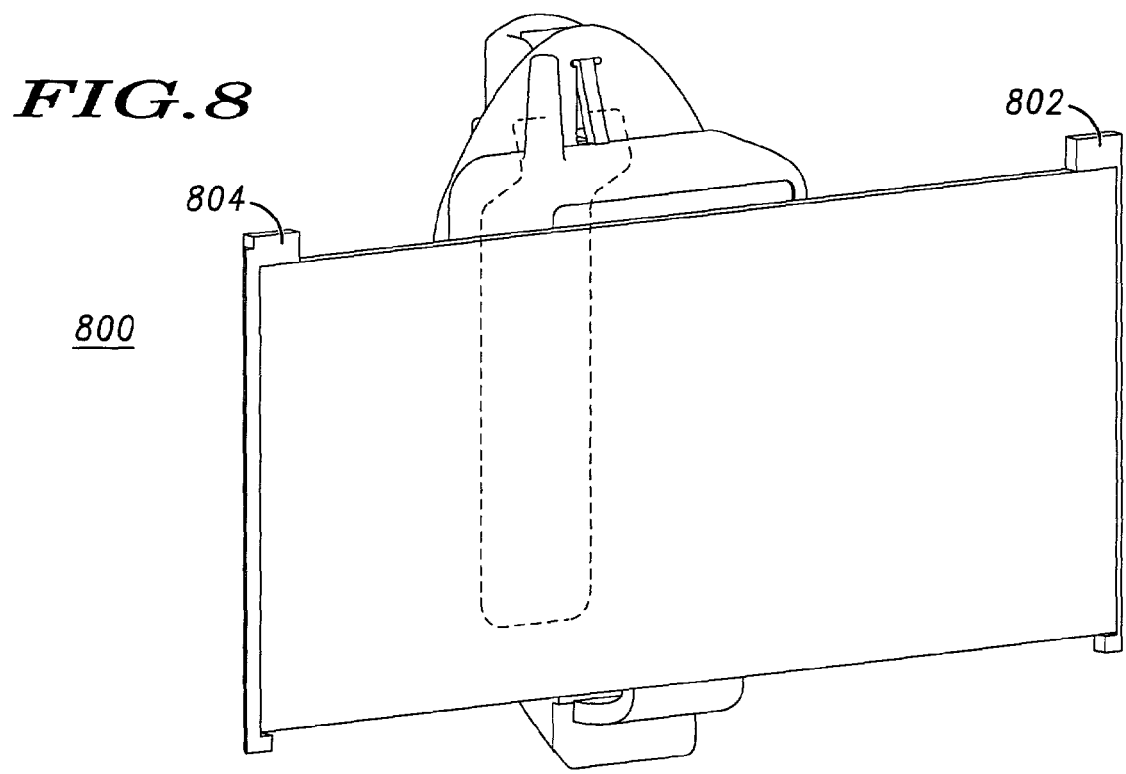
FIG. 8. is an exemplary view of the holster with the textile user interface in a first open position.
Figure 9:
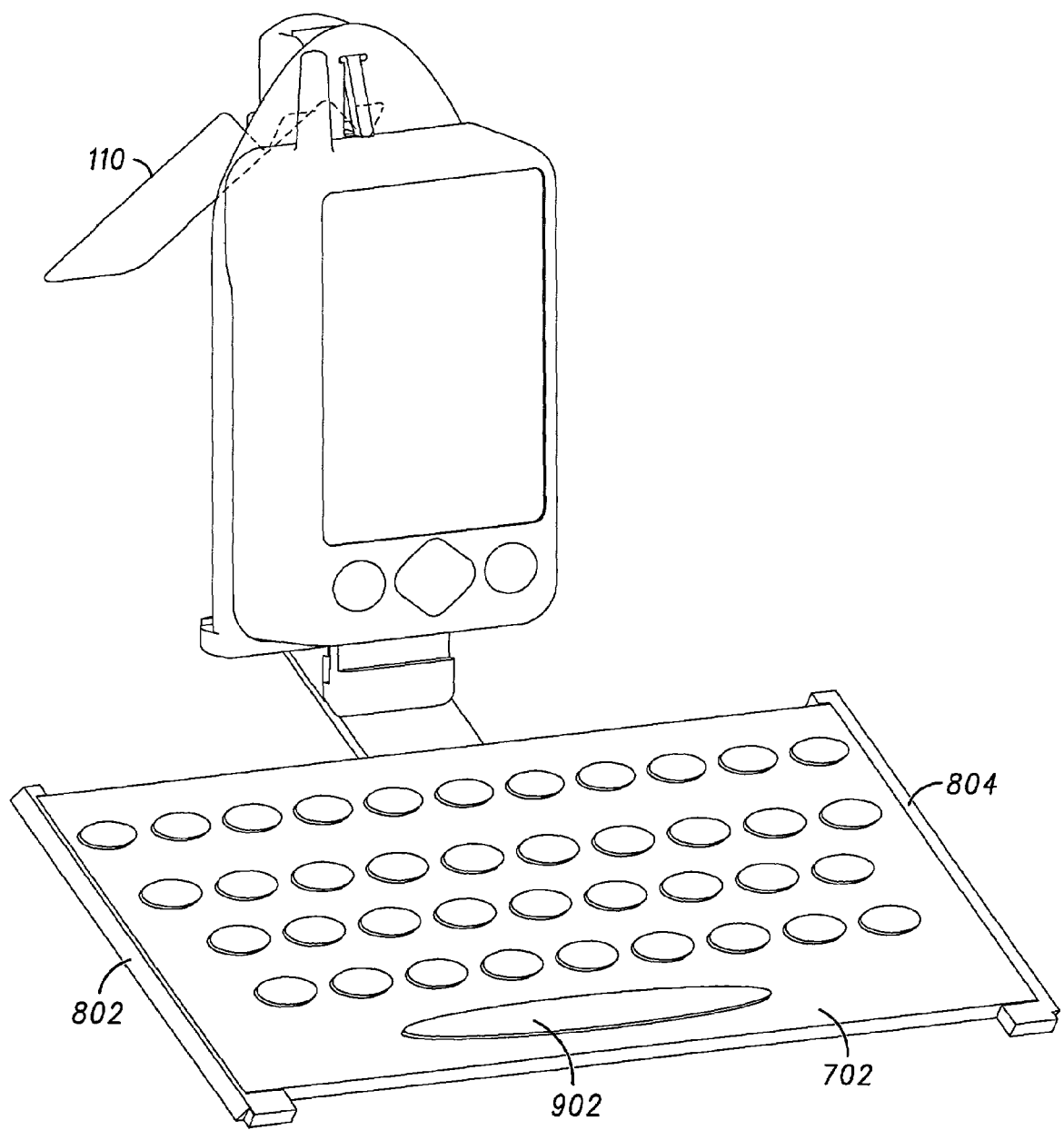
FIG. 9. is an exemplary view of the holster with the textile user interface in a full open position.

In FIG. 7. an embodiment having a textile UI 702 is shown. This embodiment is a textile keyboard (shown later) that, in a first position or stowed position 700, is wrapped around the holster 101. The textile UI 702 can be unwrapped 800 from the holster 101 as shown in FIG. 8 and FIG. 9 progressively. To use the textile UI 702, the belt clip 110 or textile UI retaining member 1002 are angularly displaced away from the holster 101 and the first and second outer edges 802, 804 are removed from between the belt clip 110 and the holster allowing the textile UI 702 to unwrap from the holster 101 shown in FIG. 8. The textile UI 702 is then folded down away from the keypad to a second or open position 900 as shown in FIG. 9. The first and second outer edges, 802 and 804 act as weights to hold the textile UI 702 securely in a flat position when in the open position 900. The outer edges 802 and 804, can also be magnetized to hold them in the stowed position 700 in the holster 101 and secure them to a metallic surface (not shown) when in the open position 900.

In one embodiment the textile UI 702 is a textile keypad 902 available from Elektex, London England. The electrotextile embeds switches (Not Shown) into a textile material that is readily foldable while the switches are fixed to a given location on the textile. In one embodiment the textile UI 702 is a QWERTY keypad 902. A wire bus (not shown) is coupled from the switches within the textile to the connector 202 in the holster. The connector 202 in the holster engages a connector in the portable electronic device 104 as described above. When the textile keypad 902 is deployed or unwrapped from the holster 101, weights within the outer edges 802 and 804 hold the textile keypad flat in the open position 900. Upon releasing the textile keypad 902 from the wrapped position and unfolded into the open position 900, power is applied to the textile UI 702.

Figure 10:
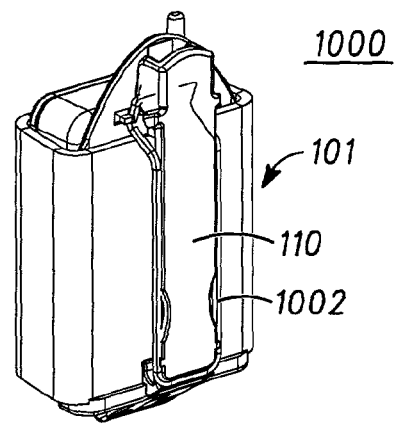
FIG. 10. is an exemplary view of the holster with the textile user interface and the belt clip in a stowed position.
Figure 11:
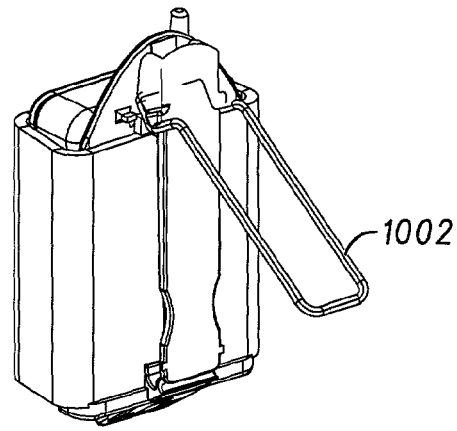
FIG. 11. is an exemplary view of the holster with the textile user interface and the belt clip in a first open position.
Figure 12:
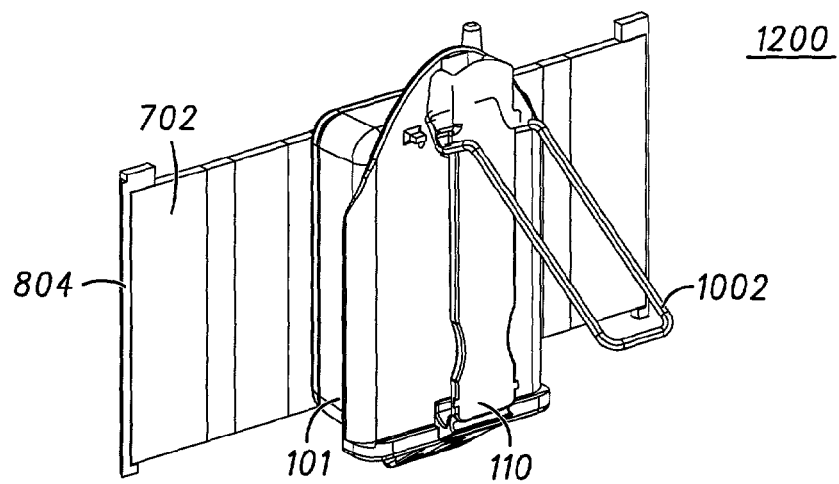
FIG. 12. is an exemplary view of the holster with the textile user interface and the belt clip in a full open position.

The holster 101 is shown with the belt clip 110 visible in FIG. 10. In the stowed position 700, 1000 a textile UI retaining member 1002 is pivotally attached to the belt clip 110. In one embodiment the belt clip 110 retains a first outer edge 802 and a second outer edge 804 that is an opposing outer edge to the first outer edge 802. In another member the textile retaining member 1002 retains the outer edge 802 and 804. The textile UI retaining member 1002 is substantially the same size as the belt clip 110. In one embodiment, shown in FIG. 1100 the pivotally textile UI retaining member 1002 rotates relative to the belt clip 110 and angularly displaces from the holster 101 and belt clip 110 to act as a stand and prop the holster 101 into an upright position. This allows the display 402 to be visible to the user when the textile keypad is in the open position. The textile UI retaining member 1002 can be made from metal or plastic and can be positioned at any angle relative to the holster. A switch (not shown) may be connected to a hinged point of the textile UI retaining member 1002 and in one embodiment closes a circuit when the textile UI retaining member 1002 is angularly displaced from the holster in the stand position 1100 activating or providing power to the textile UI 702. The switch may also be a reed switch located within the holster that activates or closes a circuit when either the textile UI 702 is unwrapped form the holster 101 or the textile UI retaining member 1002 is angularly displaced from the holster 101.

While the invention has been described in detail above, the invention is not intended to be limited to the specific embodiments as described. It is evident that those skilled in the art may now make numerous uses, modifications of, and departures from the specific embodiments described herein without departing from the inventive concepts.

What is claimed is:

1. A portable electronic device holster comprising:

a body having a portable electronic device reception cavity;
a flexible keypad disposed on said body of said holster, said flexible keypad wraps around an outer portion of said body, and wherein said flexible keypad unwraps from said body from said holster;
a portable electronic device electrical connector disposed on said holster, the electrical connector is coupled to said user interface flexible keypad; and
a belt clip in a first position is angularly displaced from said body and forms an angle such that said belt clip supports said portable electronic device in a upright position,
wherein said belt clip in a closed position holds a first edge portion and a second edge portion of said flexible keypad, between said body and said belt clip when said flexible keypad is wrapped at least partially around said body.

2. The holster of claim 1, wherein said flexible keypad is a textile keypad.

3. The holster of claim 2, wherein said textile keypad is a QWERTY keypad.

4. The holster of claim 1 wherein said portable electronic device electrical connector is a handheld wireless communication device electronic connector.

5. A mobile wireless communication handset holster comprising:
a body having a wireless communication device reception cavity;
a belt clip disposed upon said body;
a textile user interface wrapped at least partially around and coupled to said body, wherein said belt clip in a closed position holds a first edge portion and a second edge portion of said textile user interface, between said body and said belt clip when said textile user interface is wrapped around said body; and
an electrical connector disposed in said cavity of said body, said electrical connector electrically coupled to said textile user interface.

6. The holster of claim 5 wherein said textile user interface is coupled with a hinge to said holster, said hinge allowing said user interface to angularly displace from said holster in an open position.

7. The holster of claim 5 wherein said textile user interface is an electrotextile user interface wherein a portion of said electrotextile user interface is mechanically coupled to said holster, and wherein a user interface electrical coupling means is coupled to said wireless communication device through said portion of said electrotextile user interface.

8. The holster of claim 6 wherein the textile user interface is applied power when said textile user interface is in said open position.

9. The holster of claim 5 wherein said belt clip in an angularly displace position forms a stand allowing said holster to sit in an upright position.

10. The holster of claim 5 wherein a button of said textile user interface of said holster corresponds to a first function of a button having a plurality of functions on said mobile wireless communication handset.

11. A portable electronic device holster comprising:
a body having a portable electronic device reception cavity;
a belt clip coupled to the body;
a user interface disposed on said body of said holster,
wherein said user interface is a flexible keypad, said flexible keypad in a stowed position wraps around an outer portion of said body, and wherein, said flexible keypad in a user input mode position is unwrapped from said body from said holster, and
wherein said belt clip retains a first outer edge and a second outer edge of the flexible keypad retaining therein in said stowed configuration; and
a portable electronic device electrical connector disposed on said holster, the electrical connector is coupled to said user interface.

12. The holster of claim 11 wherein said flexible keypad is a textile keypad.

13. The holster of claim 12 wherein said textile keypad is a QWERTY keypad.

14. The holster of claim 13 wherein said belt clip in a first position is angularly displaced from said body and forms an angle such that said belt clip supports said portable electronic device in a upright position.

* * * * *